United States Patent
Schneider

(10) Patent No.: US 10,952,437 B2
(45) Date of Patent: Mar. 23, 2021

(54) HERBICIDAL COMPOSITION

(75) Inventor: Rudolf Schneider, Muenchwilen (CH)

(73) Assignee: SYNGENTA CROP PROTECTION LLC, Greensboro, NC (US)

( * ) Notice: Subject to any disclaimer, the term of this patent is extended or adjusted under 35 U.S.C. 154(b) by 1035 days.

(21) Appl. No.: 12/159,138

(22) PCT Filed: Dec. 27, 2006

(86) PCT No.: PCT/EP2006/012539
§ 371 (c)(1),
(2), (4) Date: Jun. 25, 2008

(87) PCT Pub. No.: WO2007/073933
PCT Pub. Date: Jul. 5, 2007

(65) Prior Publication Data
US 2009/0005246 A1 Jan. 1, 2009

(30) Foreign Application Priority Data
Dec. 27, 2005 (CH) .................................. 2075/05

(51) Int. Cl.
*A01N 43/90* (2006.01)
(52) U.S. Cl.
CPC .................................. *A01N 43/90* (2013.01)
(58) Field of Classification Search
CPC ................. A01N 25/02; A01N 43/90
See application file for complete search history.

(56) References Cited

U.S. PATENT DOCUMENTS

| | | | |
|---|---|---|---|
| 4,886,543 A * | 12/1989 | Shin ................. | A01N 43/08 504/294 |
| 6,410,480 B1 * | 6/2002 | Muhlebach et al. .......... | 504/105 |
| 6,555,499 B1 * | 4/2003 | Glock et al. ................. | 504/130 |
| 2006/0293187 A1 * | 12/2006 | Zagar et al. ................. | 504/129 |

FOREIGN PATENT DOCUMENTS

| WO | 97/34485 | 9/1997 | | |
|---|---|---|---|---|
| WO | 99/47525 | 9/1999 | | |
| WO | 00/47585 | 8/2000 | | |
| WO | 01/17351 | 3/2001 | | |
| WO | WO 03/022048 | * | 3/2003 | ............. A01N 25/00 |

OTHER PUBLICATIONS

NOSB Tap Review, Tetrahydrofurfuryl alcohol for use in crop, University of California, May 5, 2003.*
Hofer, U., et al., "Pinoxaden—for broad spectrum grass weed management in cereal crops", Journal of Plant Diseases and Protection, Special Issue XX, 2006, pp. 989-995.
Ruchs, C.A., et al., "AXIAL (R), a cereal selective graminicide for the control of annual ryegrass (*Lolium rigidum gaudin*) and other major grass weeds", Fifteenth Australian Weeds Conference entitled Managing Weeds in a Changing Climate, Papers and Proceedings, Adelaide, South Australia, Sep. 24-28, 2006, pp. 838-841.

* cited by examiner

*Primary Examiner* — Ali Soroush
*Assistant Examiner* — Danielle Sullivan
(74) *Attorney, Agent, or Firm* — BakerHostetler; Toni-Junell Herbert

(57) ABSTRACT

A herbicidal composition in the form of an emulsifiable concentrate which comprises, in addition to emulsifiers and water-insoluble solvents, 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and an alcohol.

24 Claims, No Drawings

HERBICIDAL COMPOSITION

This application is a 371 of International Application No. PCT/EP2006/012539 filed Dec. 27, 2006, which claims priority to CH 2075/05 filed Dec. 27, 2005, the contents of which are incorporated herein by reference.

The present invention relates to a herbicidal composition in the form of an emulsifiable concentrate which comprises 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester as herbicidally active compound, and to the use of such a composition in controlling weeds in crops of useful plants.

2,2-Dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester exhibits herbicidal action against weeds in cereals, especially against grasses in wheat, barley and rye crops. The compound is also known by the name pinoxaden and is described, for example, in EP-A-1 062 217.

Emulsifiable concentrates (ECs) of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester are known from Example F1. of EP-A-1 062 217. It has been found, however, that those ECs do not have adequate stability and over the course of time the herbicide is decomposed or modified, for example by hydrolysis or transesterification reactions.

The problem of the present invention is now to provide emulsifiable concentrates of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester that are distinguished by improved storage stability.

It has been found, surprisingly, that the problem can be solved by adding an alcohol as solvent to the ECs known from Example F1. of EP-A-1 062 217 or by replacing the ketone which may be present therein by the alcohol.

The present invention accordingly relates to a herbicidal composition in the form of an emulsifiable concentrate which comprises, in addition to emulsifiers and water-insoluble solvents,
a) 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and
b) an alcohol.

The presence of the alcohol in the composition according to the invention surprisingly results in a marked stabilisation of the EC. Contrary to expectation, no transesterification reactions of the herbicide are observed.

Alcohols that come into consideration are preferably $C_1$-$C_{12}$alkanols such as methanol, ethanol, propanol, hexanol, octanol and dodecanol. The alcohols may be straight-chain or branched, for example 2-ethylhexanol and isotridecanol, be present in the form of diols or triols, for example ethylene glycol, propylene glycol, dipropylene glycol and 2-methyl-2,4-pentanediol, be present in the form of glycol monoethers such as butyl glycol and butyl diglycol, and they may also be substituted, for example furfuryl and tetrahydrofurfuryl alcohol, benzyl alcohol, 4-hydroxy-4-methyl-2-pentanone, and be present in the form of esters such as lactic acid alkyl esters, for example ethyl lactate and butyl lactate. Cyclic alcohols, preferably cyclopentanol and cyclohexanol, can likewise be used according to the invention.

Preferred alcohols that may be mentioned are 2-ethylhexanol, n-octanol, benzyl alcohol, tetrahydrofurfuryl alcohol, 2-methyl-2,4-pentanediol, 4-hydroxy-4-methyl-2-pentanone and cyclohexanol as well as ethyl lactate and butyl lactate.

Special preference is given to tetrahydrofurfuryl alcohol, benzyl alcohol and 2-methyl-2,4-pentanediol.

Preferably from 1 to 97% by weight of alcohol are present in the emulsifiable concentrates according to the invention. A content of from 5 to 50% by weight, especially from 10 to 30% by weight, is especially preferred.

Those alcohols can also be mixed with one another or used in admixture with customary water-insoluble solvents. Examples of such water-insoluble solvents are aromatic hydrocarbons, such as toluene, xylene, cumene, mixtures of aromatic hydrocarbons having a boiling point of from 160 to 180° C. (Solvesso 100) or from 180 to 210° C. (Solvesso 150) or from 230 to 290° C. (Solvesso 200), aliphatic or cycloaliphatic hydrocarbons (Exxsol D80, Exxsol D100, Exxsol D120, Isopar H and Isopar V), fatty alcohol acetates (Exxate 700, Exxate 1000), isobornyl acetate, benzyl acetate, lower alkyl esters of dicarboxylic acids such as maleic, fumaric, succinic, glutaric and adipic acid (Solvent DBE), esters of benzoic acid such as benzyl benzoate, methyl benzoate and dipropylene glycol dibenzoate, as well as lower alkyl esters of higher fatty acids such as $C_8$-$C_{10}$fatty acid methyl esters and $C_{16}$-$C_{18}$fatty acid methyl esters, and ketones such as cyclohexanone, acetophenone, methyl-n-pentyl ketone.

Preferably from 0 to 95% by weight of water-insoluble solvent are present in the emulsifiable concentrates according to the invention. A content of from 10 to 70% by weight, especially from 30 to 60% by weight, is especially preferred.

For the compositions according to the invention it is possible to use the emulsifiers customarily used in connection with ECs. Examples that may be mentioned are castor oil ethoxylates, alcohol ethoxylates, tristyryl phenol ethoxylates, mixtures thereof and also mixtures with anionic surface-active compounds such as the calcium salt of dodecylbenzenesulfonic acid or the sodium salt of dioctylsulfosuccinic acid.

Preferably from 0.5 to 50% by weight of emulsifier are present in the emulsifiable concentrates according to the invention. A content of from 2 to 30% by weight, especially from 2 to 10% by weight, is especially preferred.

The compositions according to the invention may comprise, in addition to 2,2-dimethyl-propionic acid 8-(2,6-diethyl-4-methyl-phenyl)-9-oxo-1,2,4,5-tetrahydro-9H-pyrazolo[1,2-d]-[1,4,5]oxadiazepin-7-yl ester, one or more further herbicides that are compatible therewith. "Compatible" means in this context that the herbicide combination is chemically stable and exhibits neither antagonism nor increased phytotoxicity in respect of the useful plants. Such herbicides are preferably selected from the groups of the sulfonylureas, for example tria-sulfuron, tribenuron, metsulfuron, thifensulfuron, flupyrsulfuron, chlorsulfuron, prosulfuron, amidosulfuron, mesosulfuron, sulfosulfuron and tritosulfuron, aryloxyphenoxypropionates and heteroaryloxyphenoxypropionates such as clodinafop-propargyl, fenoxaprop-P-ethyl, diclofop-methyl and cyhalofop-butyl, triazolopyrimidines such as florasulam, metosulam and flumetsulam, arylcarboxylic acids, preferably dicamba and clopyralid, also aryloxycarboxylic acids, preferably esters of 2,4-D, 2,4-DP, mecoprop, mecoprop-P, MCPA, MCPB, dichlorprop-P and fluoroxypyr, cyclohexanedione oximes such as tralkoxydim, thiocarbamates such as triallate and prosulfocarb, hydroxybenzonitriles such as bromoxynil, bromoxynil octanoate, ioxynil and ioxynil octanoate, dinitroanilines such as pendimethalin and trifluralin, and also pyridinecarboxamides such as diflufenican.

Preferably from 1 to 50% by weight of herbicide (2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester (alone or in admixture with one or more further herbicides) are present in the emulsifiable concentrates according to the invention. A content of from 3 to 30% by weight, especially from 5 to 15% by weight, is especially preferred.

The compositions according to the invention allow the simultaneous use of safeners, preference being given to cloquintocet-mexyl, mefenpyr-diethyl or isoxadifen-ethyl and derivatives thereof, such as the corresponding acid and salts. Such safeners are described, for example, in The Pesticide Manual, 12th Edition, BCPC, and in DE-A-43 31 448.

Adjuvants may also be added to the compositions according to the invention, with the result that their activity can be increased. Such adjuvants can be, for example: non-ionic surfactants, mixtures of non-ionic surfactants, mixtures of anionic surfactants with non-ionic surfactants, organosilicon surfactants, mineral oil derivatives with and without surfactants, vegetable oil derivatives with and without added surfactant, fish oils and other oils of animal nature and alkyl derivatives thereof with and without surfactants, naturally occurring higher saturated and mono- or poly-unsaturated fatty acids, preferably having from 8 to 28 carbon atoms, and alkyl ester derivatives thereof, organic acids containing an aromatic ring system and one or more carboxylic acid radicals, as well as alkyl derivatives thereof. Mixtures of individual adjuvants with one another and in combination with organic solvents can result in a further enhancement of action. Adjuvants suitable for the present invention are described in EP-A-1 062 217.

The preparation of the ECs according to the invention is carried out substantially in accordance with the known customary method of dissolving the herbicide in the alcohol and optionally in the water-insoluble solvent and then adding a customary emulsifier. The mixture so obtained is stirred until a clear solution has been formed.

Whereas commercial products will preferably be formulated as concentrates, the end user will normally employ formulations diluted with water.

EXAMPLES

Example 1

EC 1

An emulsifiable concentrate of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is prepared by dissolving 10.5 g of that herbicide and 2.7 g of the safener cloquintocet-mexyl in a mixture of 1 g of Soprophor TS/10 (ethoxylated tristyryl phenol with 10 mol of ethylene oxide), 1 g of Atlas G-5000 (butanol EO/PO block copolymer), 1 g of Rhodacal 60/BE (calcium salt of dodecylbenzenesulfonic acid) and 86.7 g of Solvesso 200 ND (aromatic hydrocarbons). That corresponds substantially to the ECs according to Examples F1. a) and b) of EP-A-1 062 217.

EC 2

An emulsifiable concentrate is prepared in the same way as EC 1 but instead of 86.7 g of Solvesso 200 ND there are used only 56.7 g and additionally 30.0 g of cyclohexanone. That corresponds substantially to the ECs according to Examples F1. c) and d) of EP-A-1 062217.

EC 3

An emulsifiable concentrate is prepared in the same way as EC 1 but instead of 86.7 g of Solvesso 200 ND there are used only 56.7 g and additionally 30.0 g of tetrahydrofurfuryl alcohol. That corresponds to an EC according to the present invention.

The concentrates are stored for 2 weeks at a temperature of 70° C. The results obtained afterwards are given in Table 1 below.

TABLE 1

Comparison between EC 1, EC 2 and EC 3 in respect of the stability of the 2,2-dimethyl-propionic acid 8-(2,6-diethyl-4-methyl-phenyl)-9-oxo-1,2,4,5-tetrahydro-9H-pyrazolo[1,2-d]-[1,4,5]oxadiazepin-7-yl ester contained therein.

|  | EC 1 [g] | EC 2 [g] | EC 3 [g] |
| --- | --- | --- | --- |
| pinoxaden | 10.5 | 10.5 | 10.5 |
| cloquintocet-mexyl | 2.7 | 2.7 | 2.7 |
| ATLAS G-5000 | 1.0 | 1.0 | 1.0 |
| SOPROPHOR TS/10 | 1.0 | 1.0 | 1.0 |
| RHODACAL 60/B-E | 1.0 | 1.0 | 1.0 |
| tetrahydrofurfuryl alcohol |  |  | 30.0 |
| cyclohexanone |  | 30.0 |  |
| Solvesso 200 ND | 86.7 | 56.7 | 56.7 |
| Total | 102.9 | 102.9 | 102.9 |
| Test duration: 2 weeks at 70° C. |  |  |  |
| Loss of pinoxaden in % by weight | 25 | 39 | 13 |

The Table shows that when tetrahydrofurfuryl alcohol (EC 3) is used it is possible to obtain a significantly more stable formulation than in the case of cyclohexanone (EC 2) and Solvesso 200D alone (EC 1).

Example 2

An emulsifiable concentrate containing 107 g of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and 26 g of cloquintocet-mexyl is prepared by dissolving those compounds in a mixture of 10 g of Soprophor TS/10 (ethoxylated tristyryl phenol with 10 mol of ethylene oxide), 10 g of Atlas G-5000 (butanol EO/PO block copolymer), 10 g of Rhodacal 60/BE (calcium salt of dodecyl-benzenesulfonic acid), 524 g of Solvesso 200 ND (aromatic hydrocarbons) and 300 g of 2-methyl-2,4-pentanediol and stirring until a clear solution is obtained. The concentrate so prepared is stored for 4 weeks at a temperature of 50° C., after which only a 2% loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is observed.

Example 3

An emulsifiable concentrate is prepared as in Example 2 except that 300 g of diacetone alcohol are used instead of the 2-methyl-2,4-pentanediol. The concentrate so obtained is stored for 4 weeks at a temperature of 50° C., after which only a 2% loss of 2,2-dimethyl-propionic acid 8-(2,6-diethyl-4-methyl-phenyl)-9-oxo-1,2,4,5-tetrahydro-9H-pyrazolo-[1,2-d][1,4,5]oxadiazepin-7-yl ester is observed.

Example 4

An emulsifiable concentrate containing 129 g of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and 31 g of cloquintocet-mexyl is prepared by dissolving those compounds in a mixture of 10 g of Soprophor TS/10 (ethoxylated tristyryl phenol with 10 mol of ethylene oxide), 50 g of Atlas MBA 1307 (monobranched fatty alcohol alkoxylate), 1320 g of Solvesso 200 ND (aromatic hydrocarbons) and 500 g of tetrahydrofurfuryl alcohol and stirring until a clear solution is obtained. The concentrate so prepared is stored for 4 weeks at a temperature of 50° C., after which only a 2% loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is observed.

Example 5

An emulsifiable concentrate containing 54 g of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and 13 g of cloquintocet-mexyl is prepared by dissolving those compounds in a mixture of 10 g of Soprophor TS/10 (ethoxylated tristyryl phenol with 10 mol of ethylene oxide), 10 g of Atlas G-5000 (butanol EO/PO block copolymer), 10 g of Rhodacal 60/BE (calcium salt of dodecyl-benzenesulfonic acid), 158 g of Solvesso 200 ND (aromatic hydrocarbons), 450 g of rape oil methyl ester and 250 g of tetrahydrofurfuryl alcohol and stirring until a clear solution is obtained. The concentrate so prepared is stored for 4 weeks at a temperature of 50° C., after which only a 3% loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is observed.

Example 6

An emulsifiable concentrate containing 60 g of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester and 15 g of cloquintocet-mexyl is prepared by dissolving those compounds in a mixture of 20 g of NANSA EVM63/B (calcium dodecylbenzenesulfonate), 50 g of SERVIROX OEG 59 E (ethoxylated castor oil), 675 g of Solvesso 200 ND (aromatic hydrocarbon) and 200 g of benzyl alcohol and stirring until a clear solution is obtained. The concentrate so prepared is stored for 4 weeks at a temperature of 50° C., after which only a 3% loss of 2,2-dimethyl-propionic acid 8-(2,6-diethyl-4-methyl-phenyl)-9-oxo-1,2,4,5-tetrahydro-9H-pyrazolo[1,2-d]-[1,4,5]oxadiazepin-7-yl ester is observed.

Biological Examples 2,2-Dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is generally applied to the plant or to the locus thereof at rates of application of from 5 to 200 g/ha, especially from 10 to 80 g/ha, more especially from 30 to 60 g/ha.

The rates of application of safener are generally from 2 to 100 g/ha, preferably from 2 to 50 g/ha, especially from 7.5 to 15 g/ha.

The concentration required to achieve the desired effect can be determined by experiment. It is dependent upon the nature of the action, the stage of development of the cultivated plant and of the weed and on the application (place, time, method) and may vary within wide limits as a function of those parameters.

The rate of application of safener relative to herbicide is largely dependent upon the mode of application. Where a field treatment is carried out either by using a tank mixture with a combination of safener and herbicide or by separate application of safener and herbicide, the ratio of herbicide to safener will usually be from 1:1 to 10:1, preferably 4:1.

The herbicidal activity of the emulsifiable concentrates according to the invention is demonstrated in the following Example:

Example B1

Herbicidal Action After Emergence of the Plants

Post-Emergence Action

Monocotyledonous and dicotyledonous weeds are raised under greenhouse conditions in standard soil in plastics pots. Application of the emulsifiable concentrate is effected at the 3- to 6-leaf stage of the test plants. For that purpose, the above-mentioned EC 3 is dissolved in 400 litres of water/ha. The tests are evaluated after 20 days (% action, 100%=plant has died, 0%=no phytotoxic action); test plants: *Alopecurus myosuroides, Lolium rigidum, Avena fatua, Setaria viridis*. The results are given in Table 2 below:

TABLE 2

| Test plants | Weed control (%) at a rate of application (g ai/ha) of | | |
|---|---|---|---|
| | 8 | 16 | 64 |
| *Alopecurus myosuroides* | 70 | 80 | 100 |
| *Avena fatua* | 95 | 98 | 100 |
| *Lolium rigidum* | 100 | 100 | 100 |
| *Setaria viridis* | 80 | 100 | 100 |

What is claimed is:
1. A storage stable herbicidal composition in the form of an emulsifiable concentrate which comprises:
    a) from 5 to 15% by weight 2,2-dimethyl-propionic acid 8-(2,6-diethyl-4-methyl -phenyl)-9-oxo-1,2,4,5-tetrahydro-9H-pyrazolo[ 1,2-d] [ 1 ,4,5]oxadiazepin-7-yl ester;
    b) from 10 to 30% by weight of an alcohol, wherein the alcohol is tetrahydrofurfuryl alcohol;
    c) at least one emulsifier; and
    d) at least one water-insoluble solvent.
2. A composition according to claim 1, which comprises a further herbicide that is compatible with the 2,2-dimethyl-propionic acid 8-(2,6-diethyl-4-methyl-phenyl)-9-oxo-1,2,4,5-tetrahydro-9H-pyrazolo[ 1 ,2-d] [ 1 ,4,5]oxadiazepin-7-yl ester.
3. A composition according to claim 2, which comprises, as the further herbicide, a herbicide selected from the group consisting of: triasulfuron, tribenuron, metsulfuron, thifensulfuron, flupyrsulfuron, chlorsulfuron, prosulfuron, amidosulfuron, mesosulfuron, sulfosulfuron, tritosulfuron, clodi- nafop-propargyl, fenoxaprop-P-ethyl, diclofop-methyl, cyhalofop-butyl, florasulam, metosulam, flumetsulam, dicamba, clopyralid, an ester of 2,4-D, 2,4-DP, mecoprop, mecoprop-P, MCPA, MCPB, dichlorprop-P, fluroxypyr, tralkoxydim, triallate, prosulfocarb, bromoxynil, bromoxynil octanoate, ioxynil, ioxynil octanoate, pendimethalin, trifluralin, and diflufenican.

4. A composition according to claim 2, which comprises, as further herbicide, a member selected from the group consisting of the sulfonylureas, aryloxyphenoxypropionates, triazolopyrimidines, arylcarboxylic acids, aryloxycarboxylic acids, cyclohexanedione ox1imes, thiocarbamates, hydroxybenzonitriles, dinitroanilines and pyridinecarboxamides.

5. A composition according to claim 1, which comprises a safener.

6. A composition according to claim 5, which comprises cloquintocet-mexyl, mefenpyr-diethyl or isoxadifen-ethyl.

7. A composition according to claim 1, which comprises an adjuvant.

8. A composition according to claim 1, comprising an admixture of the alcohol with water-insoluble solvents; wherein the water-insoluble solvents are toluene; xylene; cumene; a mixture of aromatic hydrocarbons having a boiling point of from 160 to 180° C. or from 180 to 210° C. or from 230 to 290° C.; an aliphatic or cycloaliphatic hydrocarbon; a fatty alcohol acetate; isobornyl acetate; benzyl acetate; a lower alkyl ester of maleic, fumaric, succinic, glutaric or adipic acid; an ester of benzoic acid; a $C_8$-$C_{10}$ fatty acid methyl ester; an $C_{16}$-$C_{18}$ fatty acid methyl ester; cyclohexanone; acetophenone; or methyl-n-pentyl ketone.

9. A composition according to claim 1, wherein when 102.9 g of the composition, comprising 10.5 g of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester, is stored at 70° C. for 2 weeks, the loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is less than 25% by weight.

10. A composition according to claim 1, wherein, when stored at 70° C. for 2 weeks, exhibits a loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester of 13% by weight.

11. A composition according to claim 1, wherein, when stored at 50° C. for 4 weeks, exhibits a loss of 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester of from 2 to 3% by weight.

12. A method of controlling undesirable plant growth, which comprises applying a herbicidally effective amount of a composition according to claim 1 to the plants or to the locus thereof.

13. A storage stable herbicidal composition in the form of an emulsifiable concentrate, said composition comprising:
a) 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester;
b) tetrahydrofurfuryl alcohol;
c) at least one emulsifier; and
d) at least one water-insoluble solvent.

14. A composition according to claim 13, further comprising a safener.

15. A composition according to claim 14, wherein said safener comprises cloquintocet-mexyl, mefenpyr-diethyl or isoxadifen-ethyl.

16. A composition according to claim 13, further comprising an adjuvant.

17. A composition according to claim 13, wherein the at least one water-insoluble solvent is a mixture of aromatic hydrocarbons having a boiling point of from 160 to 180° C. or from 180 to 210° C. or from 230 to 290° C.

18. A composition according to claim 17, wherein the tetrahydrofurfuryl alcohol is present from 10 to 30% by weight.

19. A composition according to claim 18, wherein the at least one water-insoluble solvent is present from 30 to 60% by weight.

20. A composition according to claim 19, wherein the 2,2-dimethyl-propionic acid 8-(2,6-diethyl-4-methyl-phenyl)-9-oxo-1,2,4,5-tetrahydro-9H-pyrazolo[1,2-d][1,4,5]oxadiazepin-7-yl ester is present from 5 to 15% by weight.

21. A composition according to claim 20, wherein the at least one emulsifier is present from 2 to 10% by weight.

22. A method of controlling undesirable plant growth, said method comprising:
applying a herbicidally effective amount of a composition according to claim 13 to the plants or to the locus thereof.

23. The method of claim 22, further comprising diluting the composition.

24. The method of claim 23, wherein applying is to the locus.

* * * * *